United States Patent
Liu et al.

(10) Patent No.: US 10,234,592 B2
(45) Date of Patent: Mar. 19, 2019

(54) ELECTROMAGNETIC (EM) WELL LOGGING TOOLS AND RELATED METHODS

(71) Applicant: Duke University, Durham, NC (US)

(72) Inventors: Qing H. Liu, Durham, NC (US); Zhiru Yu, Durham, NC (US); Jianyang Zhou, Durham, NC (US)

(73) Assignee: Duke University, Durham, NC (US)

( * ) Notice: Subject to any disclaimer, the term of this patent is extended or adjusted under 35 U.S.C. 154(b) by 77 days.

(21) Appl. No.: 15/556,630

(22) PCT Filed: Feb. 8, 2016

(86) PCT No.: PCT/US2016/017011
§ 371 (c)(1),
(2) Date: Sep. 8, 2017

(87) PCT Pub. No.: WO2016/144457
PCT Pub. Date: Sep. 15, 2016

(65) Prior Publication Data
US 2018/0045846 A1    Feb. 15, 2018

Related U.S. Application Data

(60) Provisional application No. 62/131,199, filed on Mar. 10, 2015.

(51) Int. Cl.
*G01V 3/26* (2006.01)
*G01V 3/28* (2006.01)

(52) U.S. Cl.
CPC . *G01V 3/28* (2013.01); *G01V 3/26* (2013.01)

(58) Field of Classification Search
CPC .................................. G01V 3/28; G01V 3/26
(Continued)

(56) References Cited

U.S. PATENT DOCUMENTS 5,065,099 A  *  11/1991  Sinclair .................... G01V 3/28
                                                               324/339
7,457,707 B2     11/2008  Davydychev et al.
(Continued)

FOREIGN PATENT DOCUMENTS

SU         1454959 A1     1/1989

OTHER PUBLICATIONS

International Search Report and Written Opinion for PCT/US2016/017011 dated May 19, 2016.
(Continued)

*Primary Examiner* — Melissa J Koval
*Assistant Examiner* — Trung Nguyen
(74) *Attorney, Agent, or Firm* — Olive Law Group, PLLC

(57) ABSTRACT

An electromagnetic well logging tool for a wireline logging process, includes a shaft, a transmitter coil mounted on the shaft and configured to generate primary magnetic fields for propagation into a well formation, upon excitation by a first current, a receiver coil mounted on the shaft at a predefined distance from the transmitter coil and configured to receive secondary magnetic fields generated from the well formation, and a bucking coil mounted on the shaft in a concentric arrangement with the receiver coil, wherein the bucking coil is configured to generate magnetic fields at the receiver coil upon excitation by a second current, for cancelling the magnetic fields generated at the receiver coil due to direct coupling between the transmitter and receiver coils.

17 Claims, 9 Drawing Sheets

(58) Field of Classification Search
USPC ........ 324/303, 323, 333–377, 200, 256–258, 324/207.13–247, 500, 529, 530, 160, 324/177–179, 329, 637
See application file for complete search history.

(56) References Cited

U.S. PATENT DOCUMENTS

| | | |
|---|---|---|
| 7,755,361 B2 | 7/2010 | Seydoux et al. |
| 2005/0088181 A1 | 4/2005 | Barber |
| 2008/0054906 A1* | 3/2008 | Pelegri .................... G01V 3/28 324/339 |

OTHER PUBLICATIONS

International Preliminary Report on Patentability issued in counterpart PCT Application No. PCT/US2016/017011 dated Sep. 12, 2017 (five (5) pages).

* cited by examiner

ELECTROMAGNETIC (EM) WELL LOGGING TOOLS AND RELATED METHODS

CROSS REFERENCE TO RELATED APPLICATION

This is a 371 national stage patent application, which claims priority to PCT International Patent Application No. PCT/US2016/017011, filed Feb. 8, 2016, and titled ELECTROMAGNETIC (EM) WELL LOGGING TOOLS AND RELATED METHODS, which claims the benefit of U.S. Provisional Patent Application No. 62/131,199, filed Mar. 10, 2015 and titled ELECTROMAGNETIC (EM) WELL LOGGING TOOLS AND RELATED METHODS, the disclosures of which are incorporated herein by reference in their entireties.

TECHNICAL FIELD

The present disclosure relates to well logging and well logging tools. More particularly, the present disclosure relates to bucking coils in the well logging tools.

BACKGROUND

Well logging is an essential process in the oil industry to obtain information regarding a subsurface formation. The logging process is typically done in a drilled well, and is referred to as wireline logging process. The electromagnetic (EM) logging tool is one of the most widely used logging devices in the wireline logging process.

In the last few decades, the development of data interpretation methods in the oil industry is shifting from signal processing to inversion-based analysis. Signal-processing techniques are successful in enhancing data in terms of tail effect removal and resolution increasing. These techniques work well when the formation to be examined is mostly homogeneous and isotropic. However, when the formation profiles become complex, signal-processing methods fail to accurately describe the true formation. Especially in scenarios when high relative dip is involved in the logging process, measurements can include the signatures of multiple beds and second-order effects. In these cases, inversion schemes with a well-chosen parametric model may be employed. If the parametric model can describe the downhole background environment and the dip of the logging tool well, inversion methods can reconstruct radial profiling of the formation. With more and more deviated or horizontal wells being drilled, inversion techniques have become a major part of the research in the oil field industry.

For inversion methods, special attention has been paid to the computational efficiency of the forward modeling technique. Generally speaking, both forward and inverse problems are involved in an imaging algorithm. Among the available algorithms, iterative inversion techniques are the obvious choices for oil reservoir imaging problems due to their computational efficiency. However, in an iterative inversion method, the forward problem is solved in each of its iterations. As a result, the efficiency of the whole imaging process depends on the performance of the method used for the forward problem.

In an induction logging process, especially in a single well setup, canceling the direct coupling from transmitter to receivers is very important in terms of increasing the sensitivity of the tool. The original idea of bucking dates back to 1936 when an extra transmitting or receiver coil was used to counteract the effect of direct coupling. Since then, various bucking techniques were proposed to achieve better bucking effect. For instance, a symmetric structure was introduced that applied an extra bucking coil to balance the bucking effect. More complex circuit designs for bucking coils were also proposed to control both the amplitude and phase of the bucking signal. To further cancel out the bucking signal, a 4 coil system was proposed. Regardless of the method used, the one and only purpose of bucking is to cancel the direct coupling on the main receiver coil.

However, the introduction of bucking can cause problems in inversion based logging data interpretations. As mentioned, the algorithm for forward modeling needs to be efficient. Since the forward modeling of the induction logging is source dependent and the extra bucking coils can be considered extra sources in the system, the existence of bucking coils can significantly increase the computation complexity of a forward problem because each of the receiving locations are associated with a specific bucking coil. Therefore, in order to obtain an accurate estimation of the received field at receivers, forward calculations need to be done for each individual receiver coil. Depending on the number of receivers mounted on the logging tool, this extra calculation can significantly increase the computation complexity of the inverse technique.

In view of the foregoing, there is a desire for a logging tool which facilitates generation of an accurate subsurface formation profile for deep wells, with optimum computational complexity, and without compromising on accuracy of secondary field data on the receiver.

SUMMARY

Embodiments of the present disclosure provide an electromagnetic well logging tool for a wireline logging process, that includes a shaft, and transmitter, receiver and bucking coils mounted on the shaft. The transmitter coil may have a first predefined radius and a first predefined number of turns, and may be configured to generate primary magnetic fields for propagation into a subsurface formation, upon excitation by a first current. The receiver coil may have a second predefined radius and a second predefined number of turns. Further, the receiver coil may be mounted on the shaft at a predefined distance from the transmitter coil. The receiver coil is configured to receive secondary magnetic fields generated from the well formation. The bucking coil may have a third predefined radius and a third predefined number of turns. Further, the bucking coil may be mounted on the shaft in a concentric arrangement with the receiver coil. The bucking coil is configured to generate magnetic fields at the receiver coil upon excitation by a second current for cancelling the magnetic fields generated at the receiver coil due to direct coupling between the transmitter and receiver coils.

In embodiments of the present disclosure, the third predefined radius is less than the second predefined radius, and the second current is less than the first current.

In embodiments of the present disclosure, the second current has a phase opposite to that of the first current.

BRIEF DESCRIPTION OF THE DRAWINGS

The summary above, as well as the following detailed description of illustrative embodiments, is better understood when read in conjunction with the appended drawings. For the purpose of illustrating the present disclosure, example constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams in which.

DETAILED DESCRIPTION

The following detailed description illustrates embodiments of the present disclosure and manners by which they can be implemented.

Figure 1:
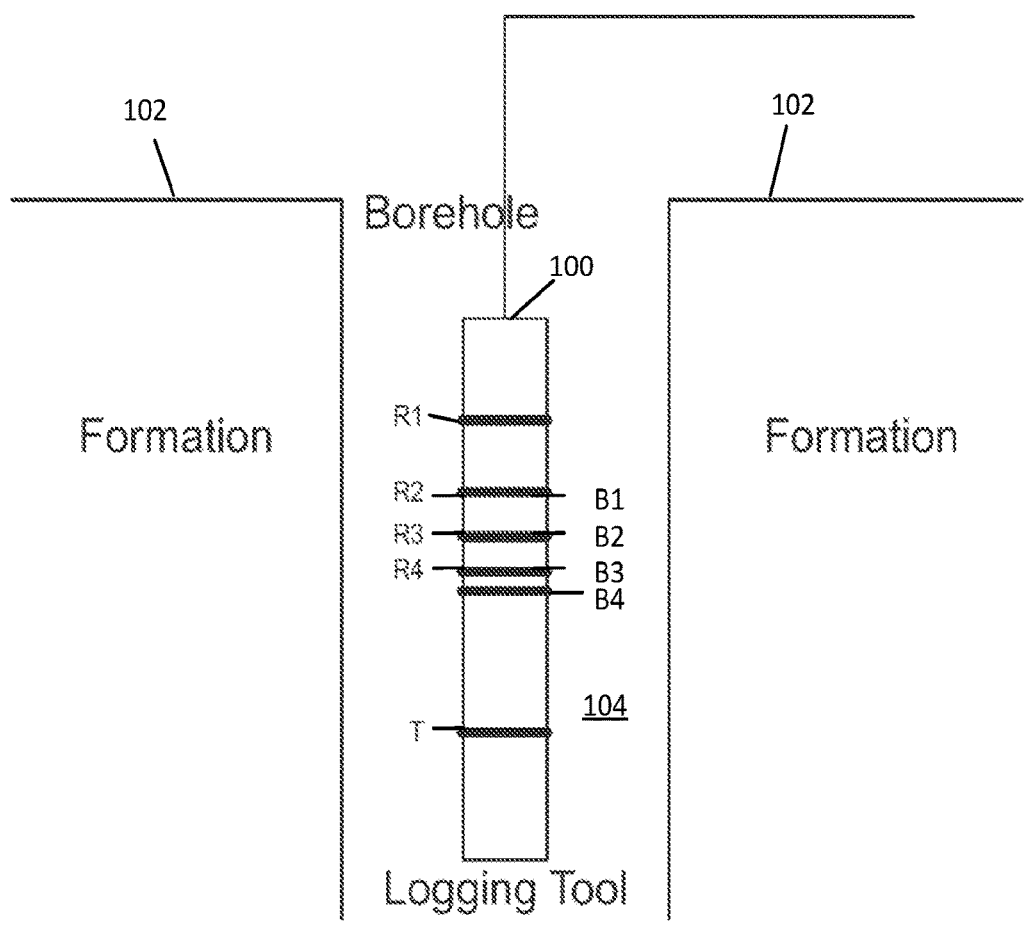
FIG. 1 illustrates a schematic diagram of an example EM logging tool for a wireline logging process.

FIG. 1 illustrates a schematic diagram of an example EM logging tool 100 for a wireline logging process. In the wireline logging process, the EM logging tool 100 may be lowered into a subsurface formation 102 through a borehole 104 via a wired connection 106. The EM logging tool 100 includes a transmitter antenna T for transmitting primary fields towards the formation 102, first through fourth receiver antennas R1-R4 for receiving the secondary fields from the formation 102, and first through fourth bucking coils B1-B4 for neutralizing the direct coupling between the transmitter and receiver antennas. The secondary fields contain information about the formation and facilitate generation of a subsurface formation profile.

Transmitter and receiver antennas T and R1-R4 may be magnetic coils made with enameled copper wire. When excited by alternating currents, the transmitter coil T generates magnetic fields that propagate into the formation 102. The total flux density B generally received at a receiver coil R4 may be represented by the following expression:

$$B = B^i + B^s \quad (1)$$

where, $B^i$ is direct coupling flux density due to direct coupling of the receiver coil R4 with the transmitter T, and $B^s$ is scattered flux density due to secondary fields generated from the formation 102.

If the transmitter coil T has a radius of a in meters, current imposed thereon is I in amperes and number of turns N, then the transmitting coil T can generate a flux density $B^i$ on the receiver coil R4 that is z meters away from the transmitter coil T in the vertical direction. The flux density $B^i$ is represented by the following expression:

$$B^i = \frac{\mu_0 N a^2 I}{2(a^2 + z^2)^{3/2}} \quad (2)$$

where $\mu_0$ is the permeability in air. The scattered flux density $B^s$ may be several order smaller than the direct coupling flux density $B^i$. This can make it difficult to detect $B^s$ in the presence of $B^i$. The first through fourth bucking coils B1-B4 eliminate $B^i$ at the receiver coils so that the total flux density B includes only scattered flux density $B^s$ corresponding to secondary field data. Using known signal processing techniques, the total flux density B may be processed for generation of the subsurface formation profile.

Figure 2:
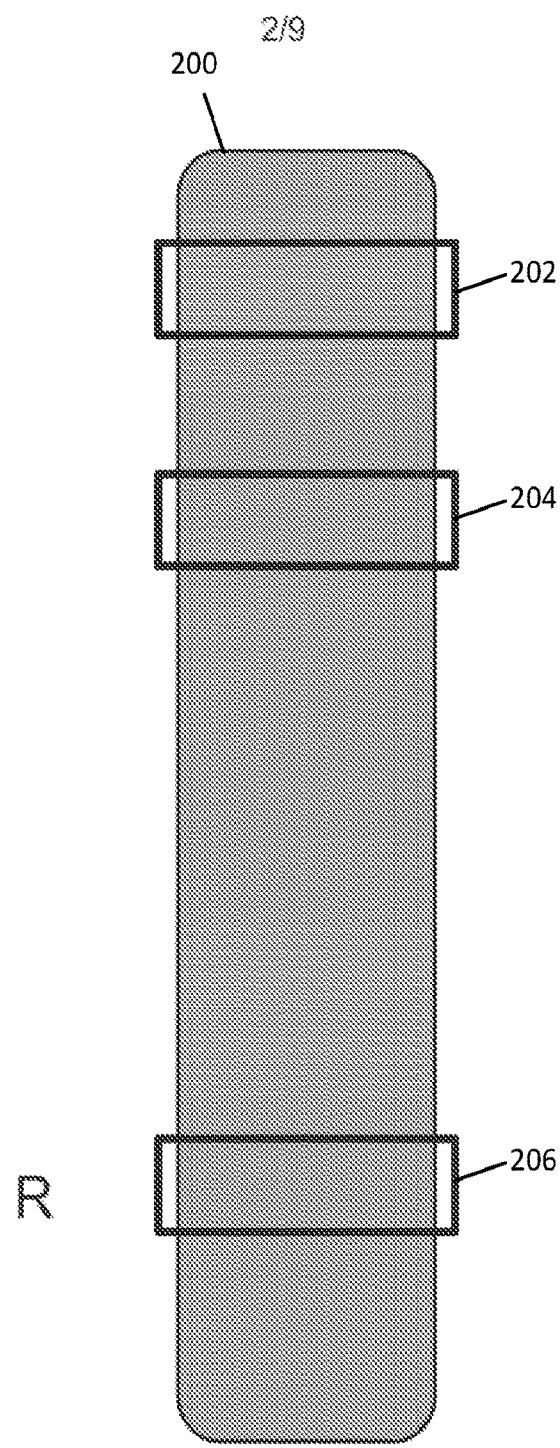
FIG. 2 illustrates a schematic diagram of another example EM logging tool for a wireline logging process.
Figure 3:
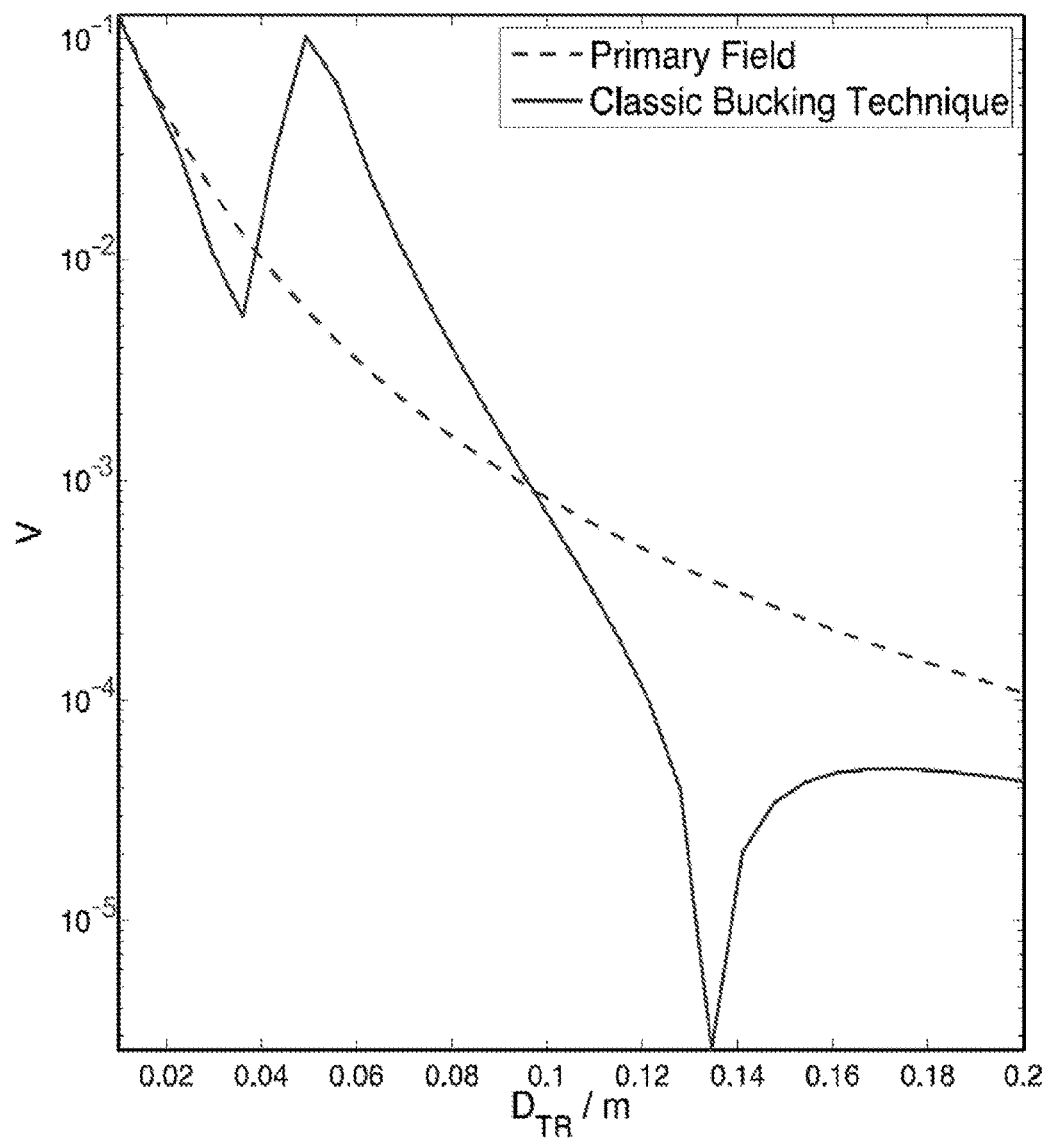
FIG. 3 is a graph showing various induced voltages on a receiver coil of the EM logging tool of FIG. 2.

FIG. 2 illustrates a schematic diagram of another example EM logging tool 200 for the wireline logging process. The tool 200 includes a transmitter 202, a bucking coil 204, and a receiver 206 of similar radii. When the location and excitation of the bucking coil 204 is well tuned, the transmitting-bucking coil set may diminish the primary field received at the receiver 206. An example of a tuned bucking result is shown in FIG. 3, which illustrates a graph showing induced voltage on the receiver 206 with the tuned bucking coil 204 (solid curve) and without the tuned bucking coil 204 (dashed line) along the center of the z axis, i.e., 1.37 cm. The number of turns for the transmitter 202, bucking coil 204, and receiver 206 and are 8, 16, and 2, respectively. The transmitter 202 works at 100 kHz, and the excitation current on the transmitter and bucking coils 202 and 204 are 110.4 mA, respectively. In this example, the minimum primary field on the receiver 206 is located at $D_{TR}$=13.5 cm, the $D_{TR}$ being the distance between transmitter and receiver 202 and 206, respectively.

Various signal-processing techniques can work well and generate an accurate subsurface formation profile when the formation 102 to be examined is mostly homogeneous and isotropic. However, when the formation profiles become complex, the signal-processing techniques fail to accurately describe the true formation. Especially, in the scenario when high relative dip is involved in the logging process, the deviated wells make data interpretation more challenging, and an inversion-based analysis may be beneficial for generation of the subsurface formation profile. For the inversion-based analysis, an imaging scheme with a well-chosen parametric model or forward model is employed. If the forward model can describe the downhole background environment and the dip of the logging tool 100 shown in FIG. 1 and the tool 200 shown in FIG. 2 well, the inversion technique can faithfully reconstruct the radial profiling of the formation, even in deviated wells. Generally, iterative inversion techniques are among the most practical choices for oil/gas reservoir imaging due to their computational efficiency. In an iterative inversion technique, the forward problem is solved at least one time per iteration. As a result, the efficiency of the imaging process can depend mostly on the performance of the technique used for the calculation of the forward problem.

Referring again to FIG. 1, in an inversion-based technique, forward calculations are made for each individual receiver coil R1-R4 in order to obtain an accurate estimation of the received field therein, because each receiver coil R1 to R4 is associated with a specific bucking coil B1-B4 respectively, and the forward modeling of induction logging is always source dependent. The first through fourth bucking coils B1-B4 are considered extra sources in the system, which can significantly increase the computation complexity of a forward problem due to additional magnetic fields generated by them. The cancellation of the primary field at the receiver locations can be very important; however, the distortion of the primary field generated by the transmitting coil caused by active bucking coils can be a major drawback in the current art of bucking. This effect may be undesired in imaging based post processing methods for the logging data. Although in some cases, one bucking coil can be physically shared with several different receiver coils, the current on the shared bucking coil needs to be adjusted for each targeted receiver coil. While bucking coils B1-B4 help obtaining accurate secondary field data, their introduction makes the forward model more computationally expansive.

Figure 4:
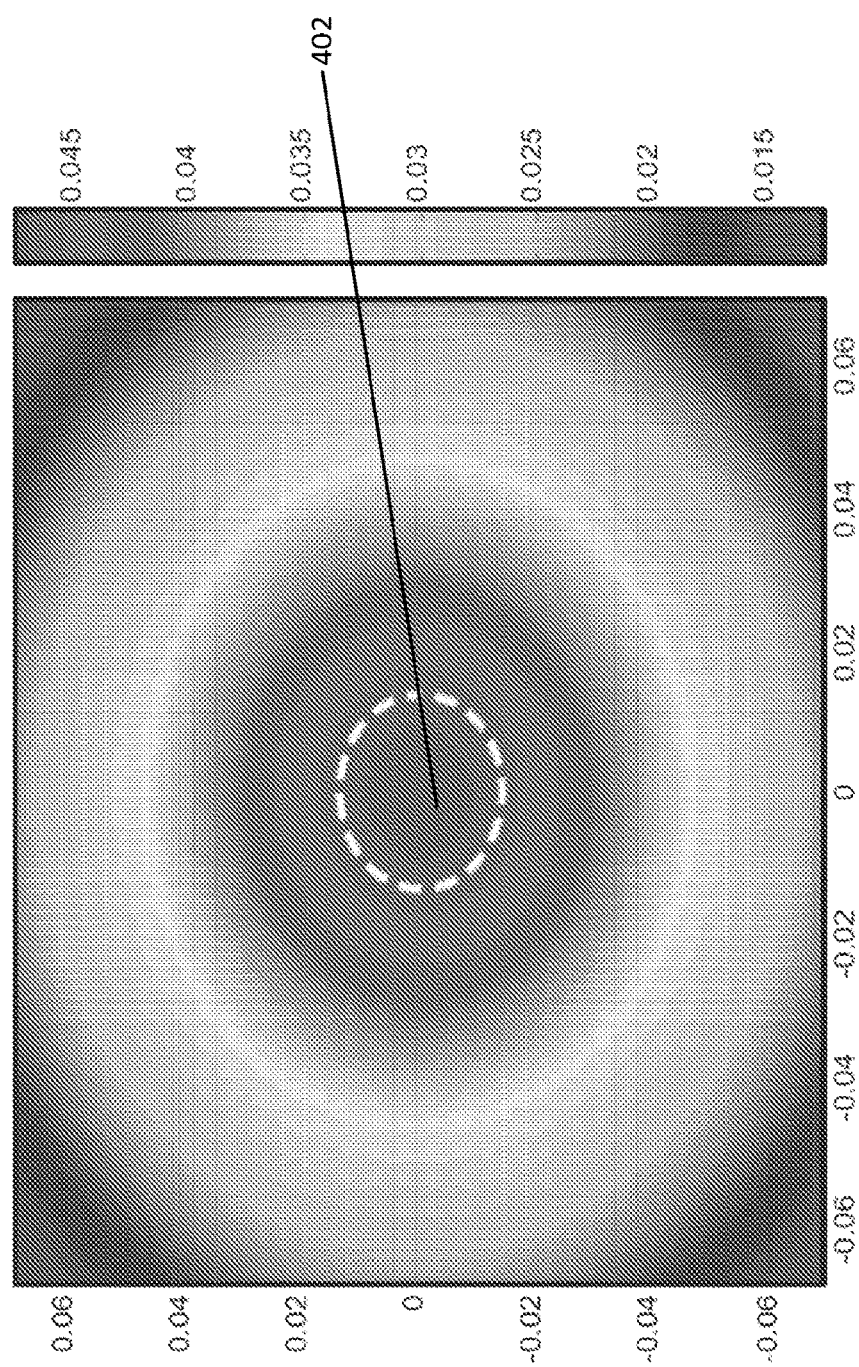
FIG. 4 depicts intensity of the $H_z$ component of a received field at the receiver coil of FIG. 2 without bucking.
Figure 5:
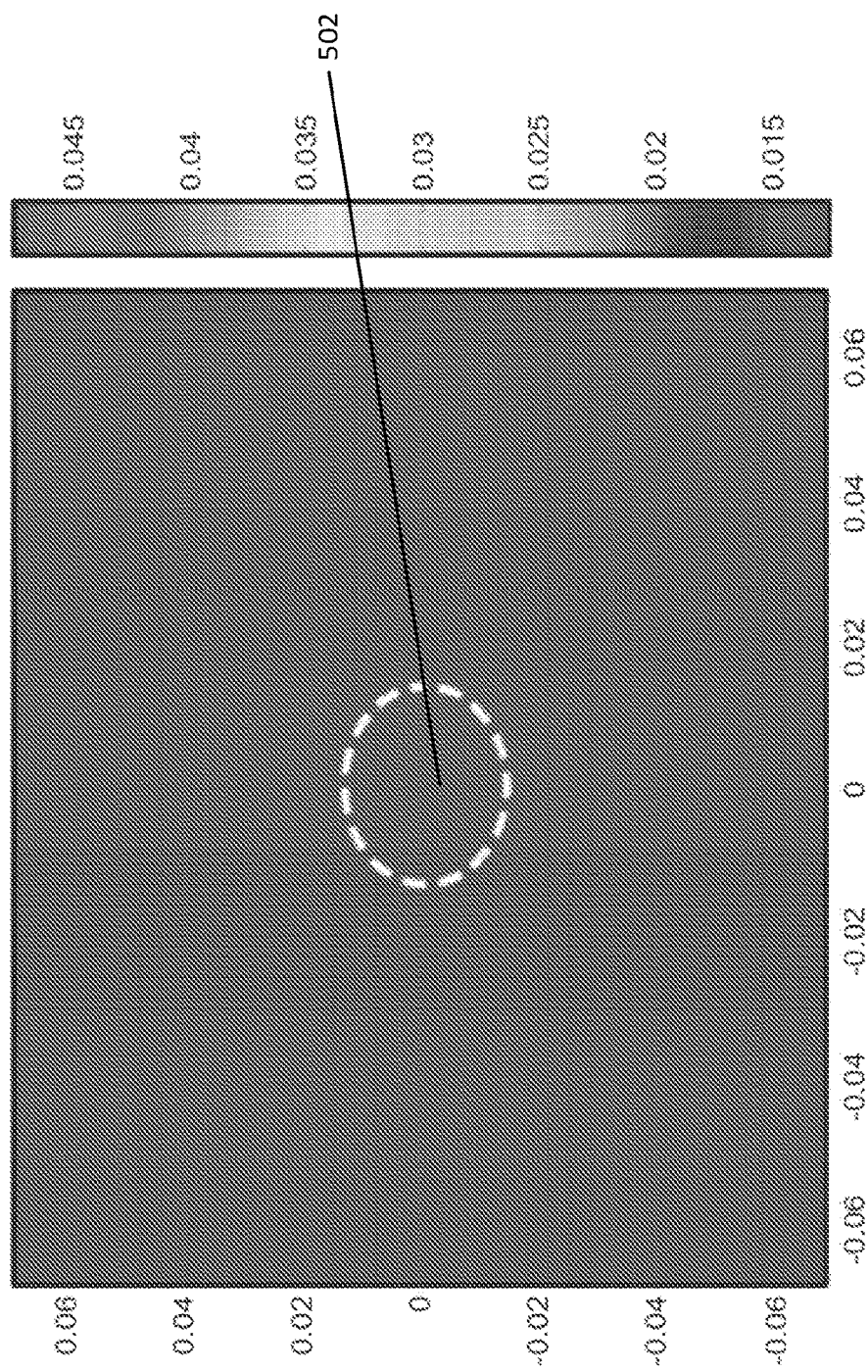
FIG. 5 depicts intensity of the $H_z$ component of a received field at the receiver coil of FIG. 2 with active bucking.

FIGS. 4 and 5 depict intensity of the $H_z$ component of the received field at the receiver 206 shown in FIG. 2 without bucking and with active bucking coil 204 shown in FIG. 2, respectively. The white dashed circles 402 and 502 indicate the borehole area. The grey-scaled bar of FIG. 5 is normalized to the level of the primary field shown in FIG. 4. Strong field intensity is received at the receiver 206 without an active bucking coil, whereas almost zero field intensity of the $H_z$ component is received at the receiver 206 with active bucking, indicating that the primary field is properly cancelled therein.

Figure 6:
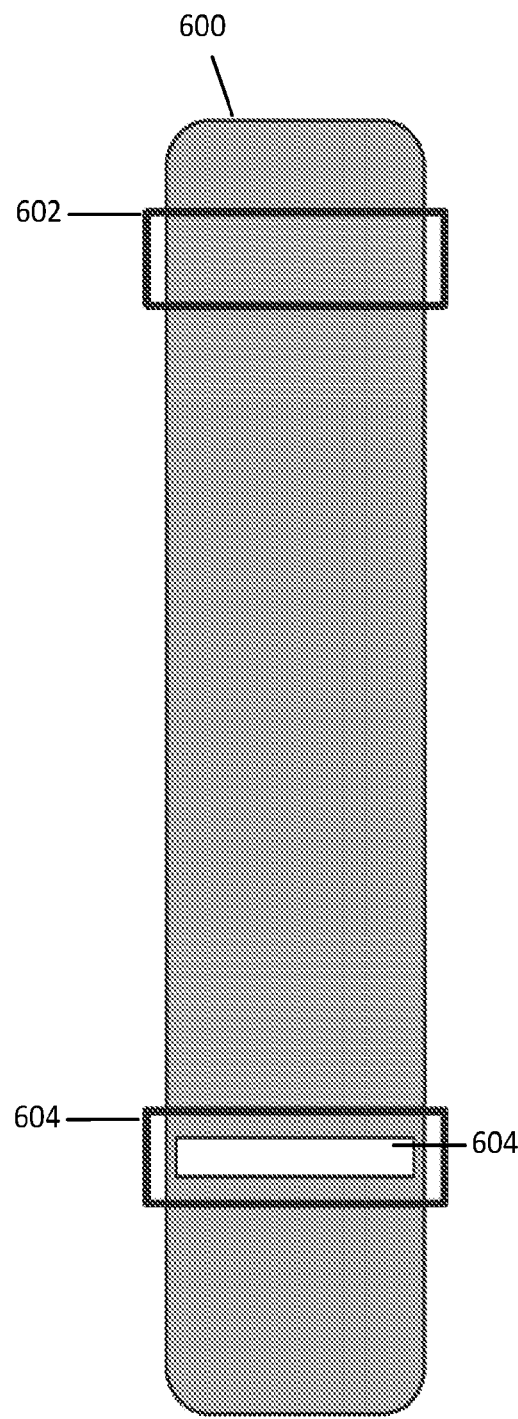
FIG. 6 illustrates a schematic diagram of an example EM logging tool for a wireline logging process in accordance with embodiments of the present disclosure.

FIG. 6 illustrates a schematic block diagram of an example EM logging tool 600 for a wireline logging process in accordance with embodiments of the present disclosure. Referring to FIG. 6, the EM logging tool 600 includes a transmitter coil 602, a receiver coil 604, and a bucking coil 606 concentric to the receiver coil 604. The transmitter, receiver, and bucking coils 602, 604, and 606 can be made of, for example, enameled copper wire or any other suitable material.

In embodiments, the bucking coil 606 has a radius smaller than that of the receiver coil 604. Further, the bucking coil 606 may be either a single turn coil or a coil with number of turns smaller than that of the receiver coil 604. In other embodiments, the bucking coil 606 can be inserted on the same horizontal plane as the receiver coil 604.

Although one receiver coil 604 and a corresponding bucking coil 606 are illustrated herein, it is noted that the EM logging tool 600 may include any number of receiver coils and bucking coils concentric to corresponding receiver coils.

In embodiments, a purpose of the concentric design of the bucking coil 606 is to diminish the distance between the receiving and bucking coils 604 and 606. When the displacement between the receiver and bucking coils 604 and 606 is very small, only a small excitation current and a small number of turns of the bucking coil 606 are required to generate equal flux densities inside the receiver coil 604 to cancel the direct coupling between the transmitter and receiver coils 602 and 604.

For example, upon excitation, the flux density $B^1$ generated by the bucking coil 606 is calculated using the following expression:

$$B^1 = \frac{-\mu_0 N^B a^2 I^B}{2(a^2 + (z^r - z^B)^2)^{3/2}} \quad (3)$$

where,
a=radius of the bucking coil 606
$N^B$=number of turns of the bucking coil 606
$I^B$=excitation current of the bucking coil 606
$z^B$=location of the bucking coil 606
$z^T$=location of the receiver coil 604.

To make the flux density $B^1$ cancel the direct coupling at the receiver coil 604, $I^B$ and $N^B$ can be tuned. When $(z^T-z^B)$ is small, a smaller number of turns $N^B$ and a smaller level of excitation current $I^B$ is needed to generate the requisite flux density $B^1$. The magnitude and phase of the excitation current $I^B$ may be carefully tuned such that the localized field generated by the bucking coil 606 cancels out the direct coupling between the transmitter and receiver coils 602 and 604 at a small area near the receiver coil 604 without affecting the primary field at other receiver locations.

Since the bucking coil 606 has a reduced size and a reduced number of turns, the magnetic fields introduced by the bucking coil 606 are negligible compared to primary fields in the formation. The effect of the active bucking coil 606 can be highly localized, and only a limited area along the vertical axis may be affected by the existence of the bucking coil 606. The bucking coil 606 can affect the fields at other receiver locations (if any) at a minimal level. In other words, the radiation from the bucking coil 606 is not a source of disturbance to the system, does not increase the computational complexity of forward modeling in inversion based analysis, and the secondary field at the receiver coil 604 can be obtained in one forward calculation.

The EM logging tool shown in FIG. 6 should be considered an example, which should not unduly limit the scope of the claims herein. There are many different variations, alternatives, and modifications that may be made to the tool within the scope of the presently disclosed subject matter.

Figure 7:
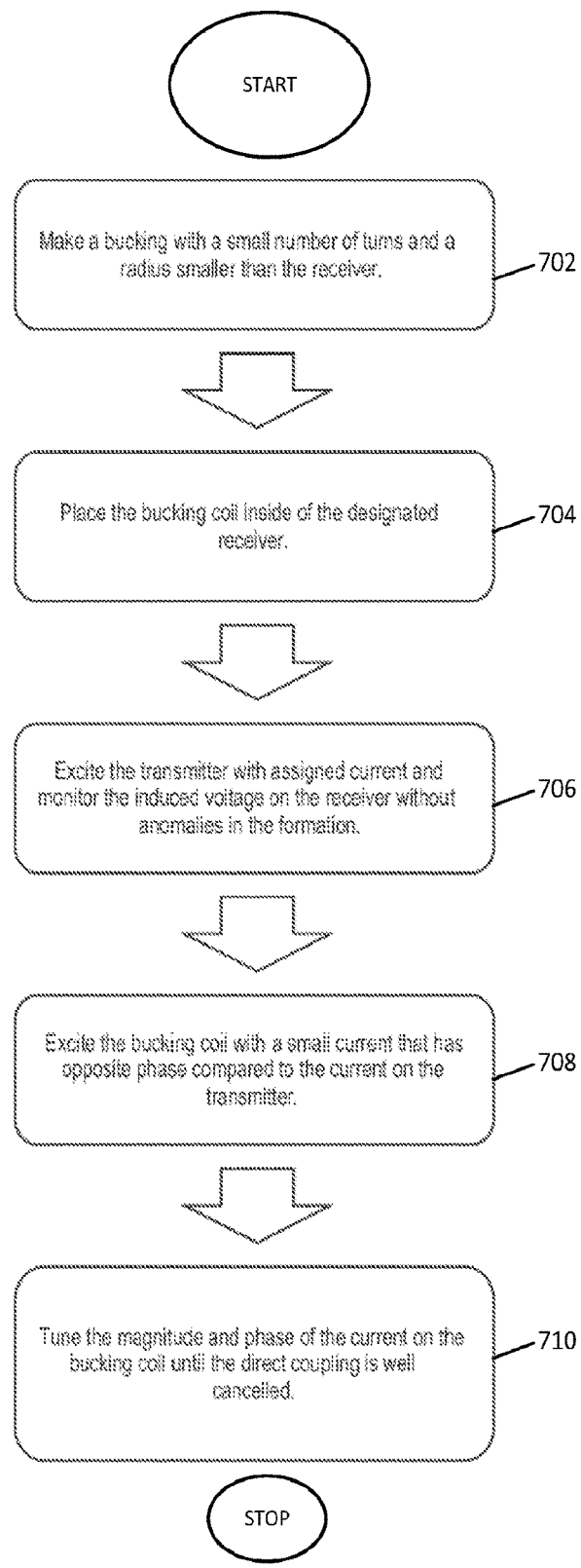
FIG. 7 is flowchart of an example method of designing and operating an EM logging tool in accordance with embodiments of the present disclosure.

FIG. 7 is a flowchart of an example method of designing and operating an EM logging tool in accordance with embodiments of the present disclosure. For example, the EM logging tool 600 may be utilized.

At a step 702, a bucking coil 606 is made that has a radius smaller than that of the corresponding receiver coil 604. The bucking coil 606 may be either a single turn coil or a coil with number of turns smaller than that of the receiver coil 604.

At a step 704, the bucking coil 606 is placed inside of the receiver coil 604 in a concentric manner.

At a step 706, the transmitter coil 602 is excited, and the induced voltage on the receiver coil 604 is monitored. The induced voltage on the receiver coil 604 is due to the direct coupling between the transmitter and receiver coils 602 and 604.

At a step 708, the bucking coil 606 is activated with a small current that has a phase opposite to that of the transmitter coil 602. Upon activation of the bucking coil 606, a significant drop in the induced voltage on the receiver coil 604 may be observed.

At a step 710, the magnitude and phase of the current on the bucking coil 606 is fine tuned until the induced voltage on the receiver coil 604 drops to a predefined minimum level.

The steps 702 to 710 are only illustrative and other alternatives can also be provided where one or more steps are added, one or more steps are removed, or one or more steps are provided in a different sequence without departing from the scope of the disclosure.

Figure 8:
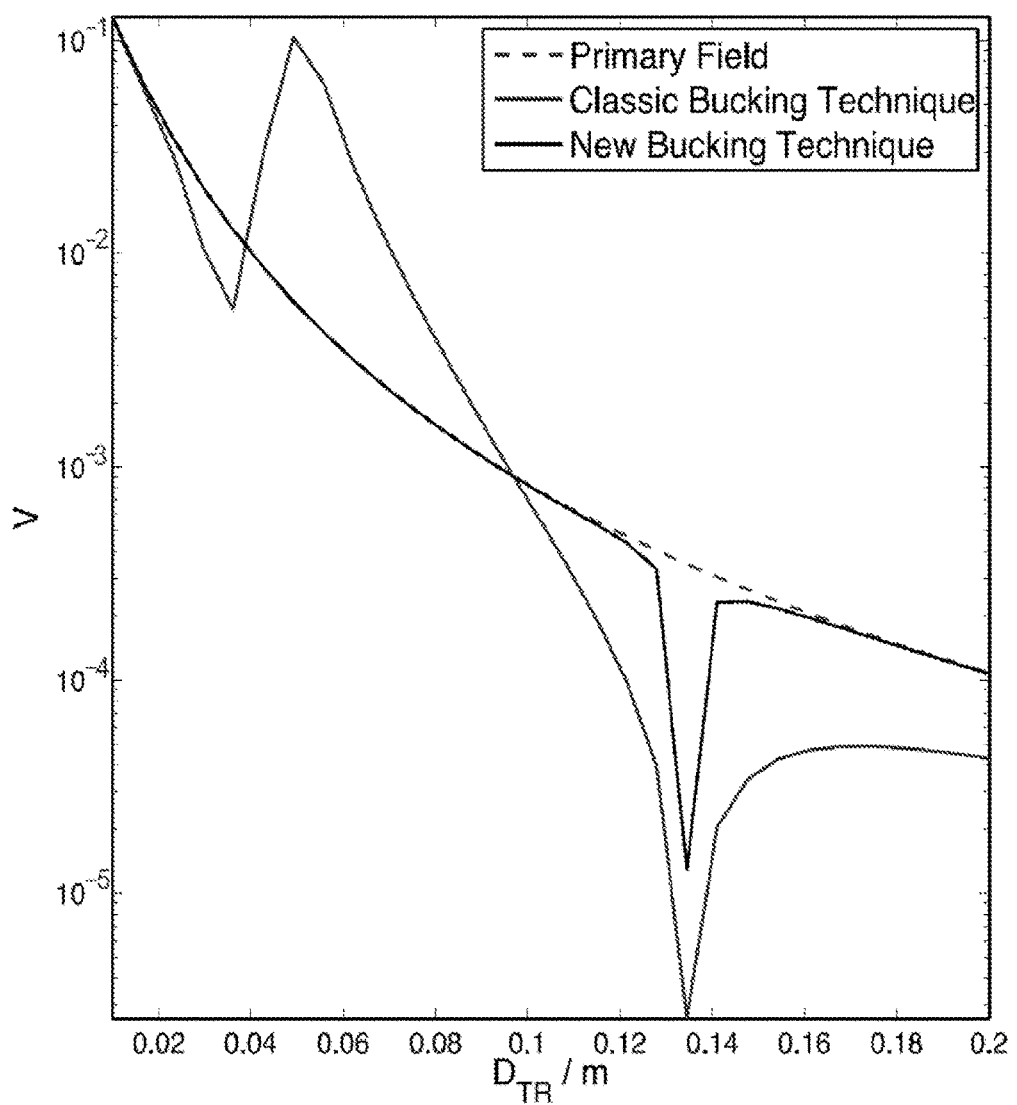
FIG. 8 is a graph showing various induced voltages on a receiver coil of the EM logging tool along the center of the z axis in accordance with embodiments of the present disclosure.

FIG. 8 is a graph showing various induced voltages on a receiver coil (for example, the receiver coil 604) along the center of the z axis, for various $D_{TR}$ (distance between the transmitter and receiver) when the transmitter coil 602 is excited under different scenarios. Herein, the radius of the transmitter and receiver coils 602 and 604 is 1.37 cm, and the radius of the bucking coil 606 is 0.97 cm. Further, the number of turns for the transmitter coil 602, receiver coil 604 and bucking coil 606 are 8, 16, and 2, respectively. The excitation current on the transmitter coil 602 is 110.4 mA, and the excitation current on the bucking coil 606 is 0.23 mA. Further, the transmitter coil 602 operates at 100 KHz.

A dashed line 802 herein, represents the induced voltages on the receiver coil 602 when the bucking coil 606 is not excited. A dash-dot line 804 herein, represents the induced voltages on the receiver coil 602 with prior bucking schemes (for example, bucking scheme illustrated in FIG. 2). A solid line 806 herein, represents the induced voltages on the receiver coil 602 when the bucking coil 606 is excited. The solid line 806 indicates that minimum primary field is obtained on the receiver coil 602 at $D_{TR}$=13.5 cm, and only a limited area along the vertical axis is affected by the existence of the bucking coil 606. The effect of the active bucking coil 606 is highly localized due to the smaller excitation current and size, and the active bucking coil 606 does not induce high primary fields at other receiver locations unlike the prior art bucking schemes. The same conclusion may be applied to the horizontal plane at the receiver coil 604.

Figure 9:
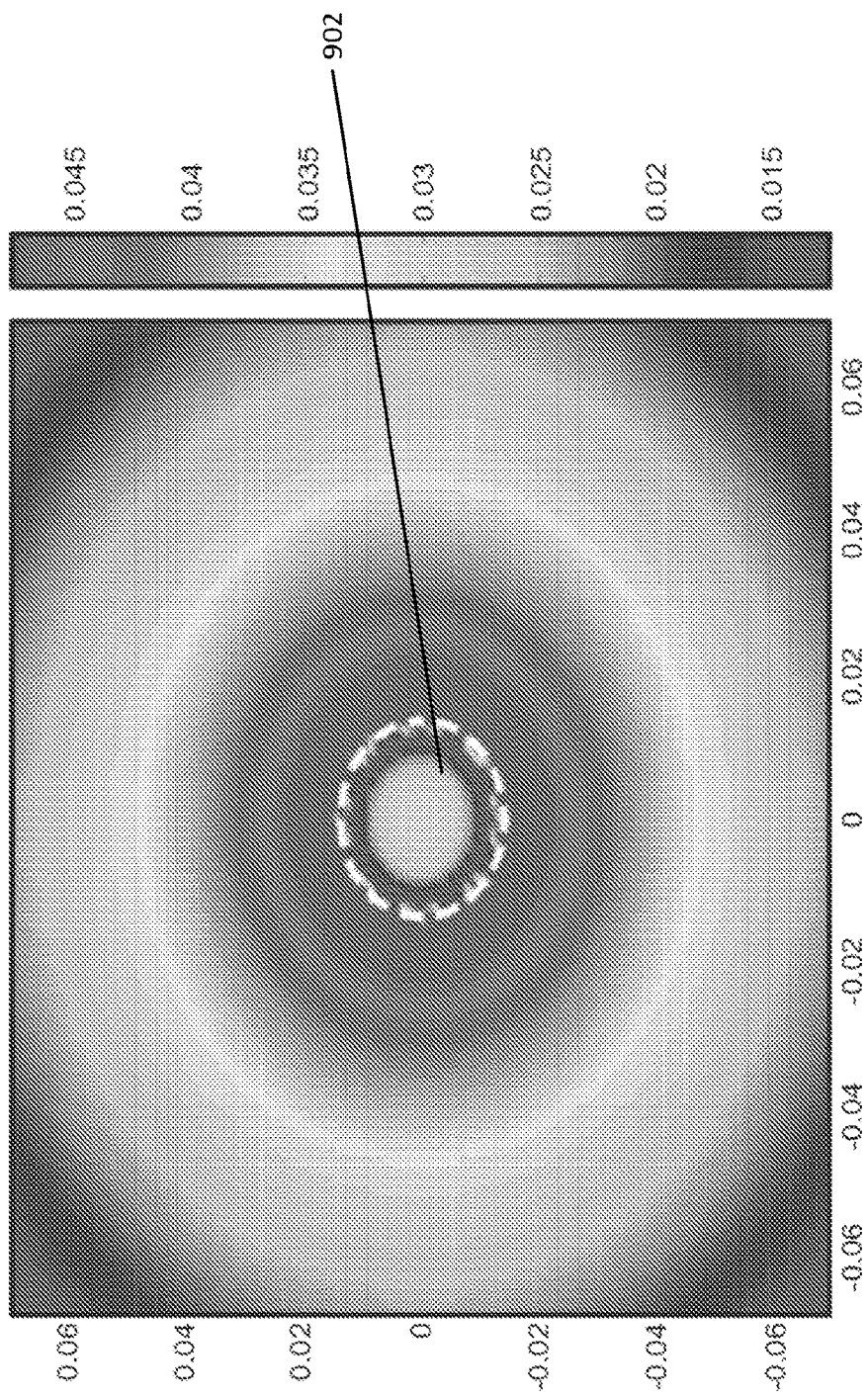
FIG. 9 depicts intensity of the $H_z$ component of the received field at a receiver coil when the corresponding bucking coil is excited in accordance with embodiments of the present disclosure.

FIG. 9 depicts intensity of the $H_z$ component of the received field at the receiver coil 604 when the bucking coil 606 is excited in accordance with embodiments of the present disclosure. Referring to FIG. 9, a white dashed circle 902 represents the borehole area, where the field intensity inside the borehole area 902 is well cancelled, and the field intensity outside the borehole area 902 remains intact. As a result, the secondary fields received at the receiver coil 604 remain the same as if no bucking coils are inserted. Therefore, only one forward solution is needed to calculate the secondary field distribution at all the receiver coils of an EM logging tool, thereby drastically decreasing the computation time for an inversion based imaging technique.

Without in any way limiting the scope, interpretation, advantages of one or more of the example embodiments disclosed herein, techniques described herein may include cancelling most of the direct coupling of the signals from transmitter to receiver coils in a well logging tool, while minimizing their effects on the spatial distribution of the primary field introduced by the transmitter. By shrinking the size and making the bucking coil concentric to the receiver coil, only a small current is needed to activate the bucking coil to cancel the primary field at a receiver location. Since the field intensity caused by the bucking coil is highly localized, it does not affect the primary field outside the borehole area. With a simple modification in size and position of bucking coil(s) in the well logging tool, the bucking effect at the receiver is achieved without introducing a large distortion to the primary field radiated by the transmitting coil in space. The preservation of the primary field means only one solution is needed for all receivers in the forward modeling of a logging process. As a result, a big amount of computation time can be saved in an imaging process of logging data, thus decreasing the computation complexity of the inversion method, and greatly increasing the efficiency of the inversion.

While various embodiments of the present disclosure have been illustrated and described, it will be clear that the present disclosure is not limited to these embodiments only. Numerous modifications, changes, variations, substitutions, and equivalents will be apparent to those skilled in the art, without departing from the spirit and scope of the present disclosure. The singular forms "a," "an," and "the" include plural referents unless the context clearly dictates otherwise.

Unless otherwise indicated, all numbers expressing quantities of distance, frequencies, and so forth used in the specification and claims are to be understood as being modified in all instances by the term "about." Accordingly, unless indicated to the contrary, the numerical parameters set forth in this specification and attached claims are approximations that can vary depending upon the desired properties sought to be obtained by the presently disclosed subject matter.

What is claimed is:

1. An electromagnetic well logging tool for a wireline logging process, the tool comprising:
   a shaft;
   a transmitter coil of a first predefined radius and a first predefined number of turns mounted on the shaft, wherein the transmitter coil is configured to generate primary magnetic fields for propagation into a well formation, upon excitation by a first current;
   a receiver coil of a second predefined radius and a second predefined number of turns mounted on the shaft at a predefined distance from the transmitter coil, wherein the receiver coil is configured to receive secondary magnetic fields from the well formation; and
   a bucking coil of a third predefined radius and a third predefined number of turns mounted on the shaft in a concentric arrangement with the receiver coil, wherein the bucking coil is configured to generate magnetic fields at the receiver coil upon excitation by a second current for cancelling the magnetic fields generated at the receiver coil due to direct coupling between the transmitter coil and the receiver coil.

2. The tool of claim 1, wherein the third predefined radius is less than the second predefined radius and the second current is less than the first current.

3. The tool of claim 1, wherein the second current has a phase opposite to that of the first current.

4. The tool of claim 1, wherein the bucking coil is on about the same plane as the receiver coil.

5. The tool of claim 1, wherein the bucking coil is a single turn coil.

6. The tool of claim 1, wherein the bucking coil is a multi-turn coil.

7. The tool of claim 1, wherein the bucking coil is placed inside the receiver coil in a concentric manner.

8. A method for a wireline logging process, the method comprising:
   providing an electromagnetic well logging tool comprising:
      a shaft;
      a transmitter coil of a first predefined radius and a first predefined number of turns mounted on the shaft;
      a receiver coil of a second predefined radius and a second predefined number of turns mounted on the shaft at a predefined distance from the transmitter coil; and
      a bucking coil of a third predefined radius and a third predefined number of turns mounted on the shaft in a concentric arrangement with the receiver coil, wherein the bucking coil is configured to generate magnetic fields at the receiver coil upon excitation at the receiver coil due to direct coupling between the transmitter coil and the receiver coil;
   using the transmitter coil to generate primary magnetic fields for propagation into a well formation upon excitation by a first current;
   using the receiver coil to receiver secondary magnetic fields from the well formation; and using the bucking coil to generate magnetic fields at the receiver coil upon excitation at the receiver coil due to direct coupling between the transmitter coil and the receiver coil.

9. The method of claim 8, wherein using the transmitter coil comprises exciting the transmitter coil.

10. The method of claim 9, further comprising induced voltage on the receiver coil induced by coupling between the transmitter coil and the receiver coil.

11. The method of claim 10, further comprising tuning magnitude and phase of the current on the bucking coil until the induced voltage on the receiver coil drops to a predefined minimum level.

12. The method of claim 8, wherein the third predefined radius is less than the second predefined radius, the third predefined number of turns is less than the second predefined number of turns, and the second current is less than the first current.

13. The method of claim 8, wherein the second current has a phase opposite to that of the first current.

14. The method of claim 8, wherein the bucking coil is on about the same plane as the receiver coil.

15. The method of claim 8, wherein the bucking coil is a single turn coil.

16. The method of claim 8, wherein the bucking coil is a multi-turn coil.

17. The method of claim 8, wherein the bucking coil is placed inside the receiver coil in a concentric manner.

\* \* \* \* \*